United States Patent
Grayson

(10) Patent No.: US 7,457,269 B1
(45) Date of Patent: Nov. 25, 2008

(54) COLLISION AVOIDANCE OF RACH SIGNALS IN A TDMA SATELLITE COMMUNICATION SYSTEM

(75) Inventor: Mark Grayson, Chiswick (GB)

(73) Assignee: ICO Services Ltd, London (GB)

( * ) Notice: Subject to any disclaimer, the term of this patent is extended or adjusted under 35 U.S.C. 154(b) by 0 days.

(21) Appl. No.: 10/258,030

(22) PCT Filed: Apr. 20, 2000

(86) PCT No.: PCT/GB00/01568

§ 371 (c)(1),
(2), (4) Date: May 13, 2003

(87) PCT Pub. No.: WO01/82503

PCT Pub. Date: Nov. 1, 2001

(51) Int. Cl.
*H04B 7/212* (2006.01)

(52) U.S. Cl. .......... 370/337; 370/447; 370/461

(58) Field of Classification Search ........ 370/329, 370/337, 322, 458, 331, 346, 348, 349, 341, 370/342; 455/13.2, 427, 12.1
See application file for complete search history.

(56) References Cited

U.S. PATENT DOCUMENTS

| | | | | |
|---|---|---|---|---|
| 6,075,779 A * | 6/2000 | Agarwal et al. | .......... | 370/337 |
| 6,314,366 B1 * | 11/2001 | Farmakis et al. | .......... | 701/201 |
| 6,317,585 B1 * | 11/2001 | Shibasaki | .......... | 455/13.2 |
| 6,621,803 B2 * | 9/2003 | Halton et al. | .......... | 370/329 |
| 6,690,661 B1 * | 2/2004 | Agarwal et al. | .......... | 370/337 |

FOREIGN PATENT DOCUMENTS

| | | |
|---|---|---|
| EP | 0 738 052 A | 8/1996 |
| WO | WO 98 23112 A | 5/1998 |
| WO | WO 99 21328 A | 4/1999 |

* cited by examiner

*Primary Examiner*—Chau Nguyen
*Assistant Examiner*—Kenneth R Hartmann
(74) *Attorney, Agent, or Firm*—Steptoe & Johnson LLP

(57) ABSTRACT

In a cellular mobile telephone system, a mobile station (4d, 4e) requests allocation of a traffic channel by sending a request in a random access channel. Where there is a significant path length difference between locations in a cell and a network antenna, for instance on a satellite (3), not all of the available TDMA slots are used for random access signals. Instead, gaps of one to three time slots are left between valid random access time slots (103, 104) to avoid collision between random access bursts arriving at the network antenna along paths of different lengths.

4 Claims, 8 Drawing Sheets

COLLISION AVOIDANCE OF RACH SIGNALS IN A TDMA SATELLITE COMMUNICATION SYSTEM

The present invention relates to a method of avoiding collision between random access channel signals in a TDMA mobile telephone system in which there is a significant difference between two locations in a cell and a network antenna, and to a mobile station.

Various proposals have been made for satellite mobile telephone systems. These include the Inmarsat-M system, the IRIDIUM™ system described in EP-A-0365885, the ICO™ system described in GB-A-2295296 and the ODYSSEY™ system described in EP-A-0510789.

Where a significant difference exists between the path length from a mobile station at a first location in a cell to a network antenna of a TDMA mobile telephone system and the path length from a mobile station at a second location in the cell to the network antenna, there is the possibility that random access signals from the stations will collide at the antenna. This situation arises in satellite mobile telephone systems and also in systems having hierarchical cell structures.

According to the present invention, there is provided a method of avoiding collision between random access channel signals in a TDMA mobile telephone system in which there is a significant difference between two locations in a cell and a network antenna, the method comprising operating a mobile station so as to establish a local timebase at the mobile station on the basis of a received broadcast control information signal and disabling transmission of random access channel signals during a subset of the time slots of said local timebase. Consequently, there is a reduction in wasted random access channel transmissions, thereby conserving power at the mobile station.

The random access channel signal transmission by the mobile station may be enabled in time slots separated by n time slots, during which random access channel signal transmission is disabled, where n is a positive integer selected to avoid random access channel signal collisions in the cell having the largest mobile station-network antenna path length differential. However, it is preferable that random access channel signal transmission by the mobile station is enabled in time slots separated by n time slots, during which random access channel signal transmission is disabled, where n is a positive integer communicated to the mobile station in a broadcast control channel.

When the present invention is applied to a satellite mobile telephone system, the network antenna will be carried by a satellite.

According to the present invention, there is also provided a mobile station for a TDMA mobile telephone system configured for operation in a method according to the present invention. Such a mobile station differs from known mobile stations in the programming of its controller.

An embodiment of the present invention will now be described, by way of example, with reference to the accompanying drawings, in which:—

Figure 1:
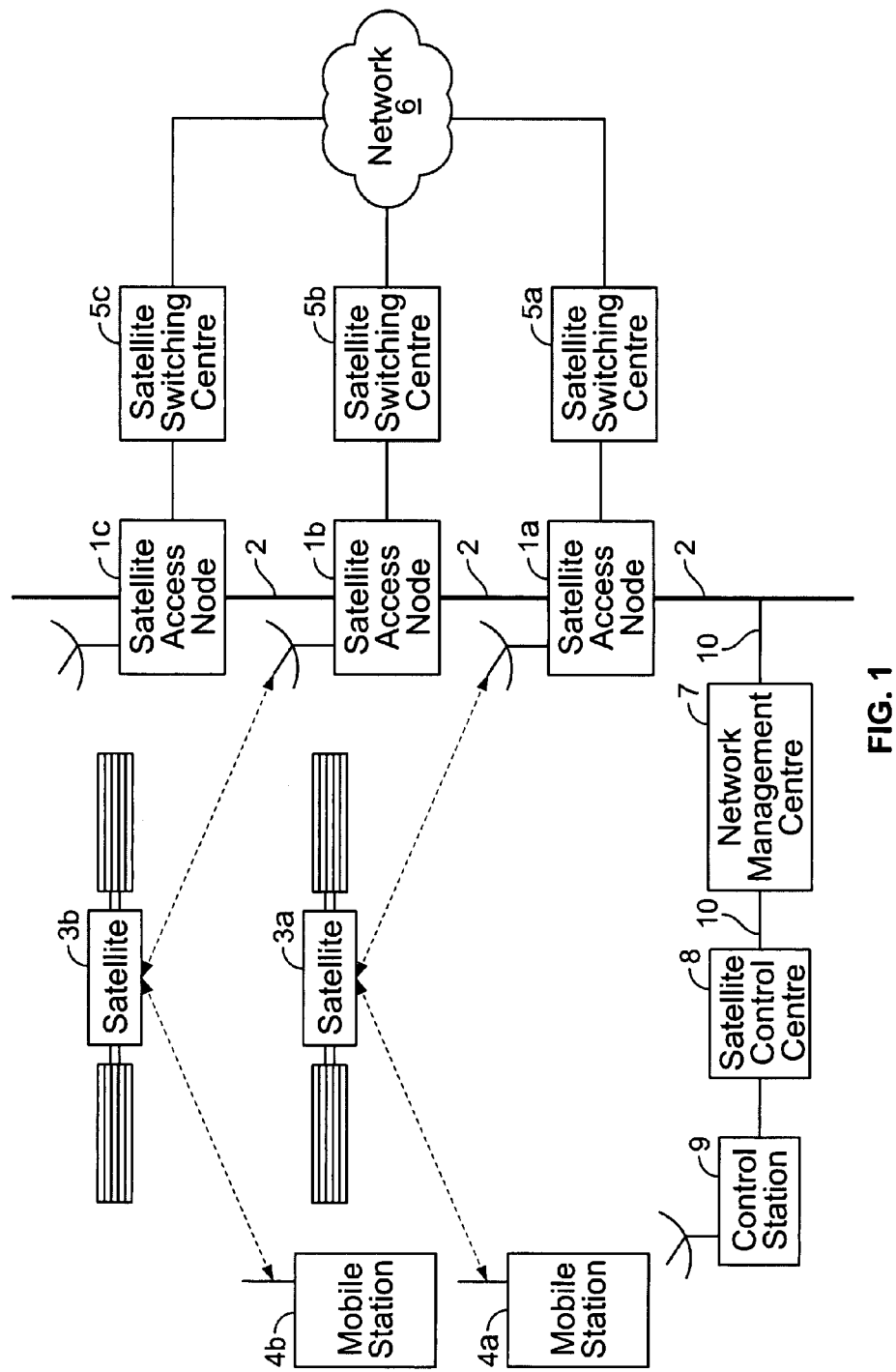
Figure 2:
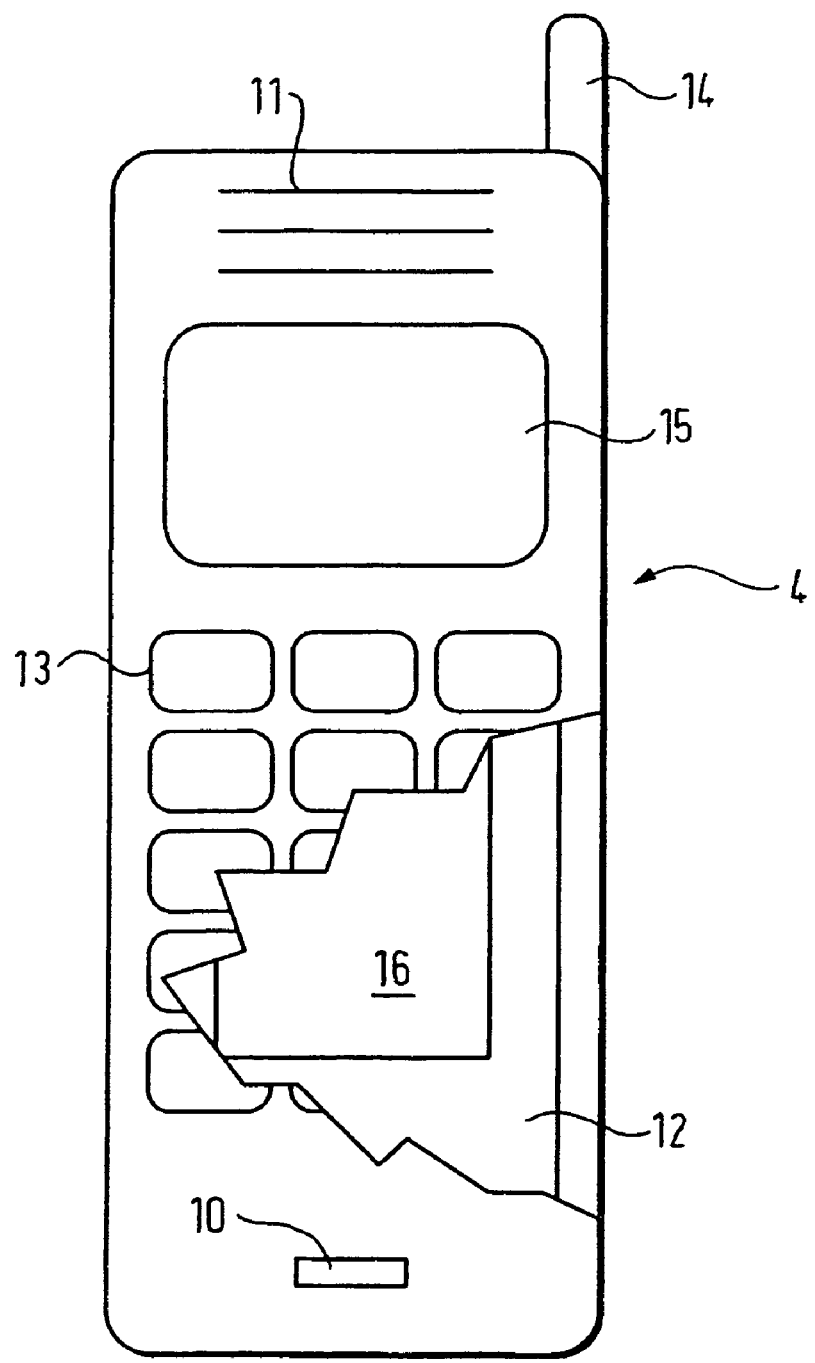
Figure 3:
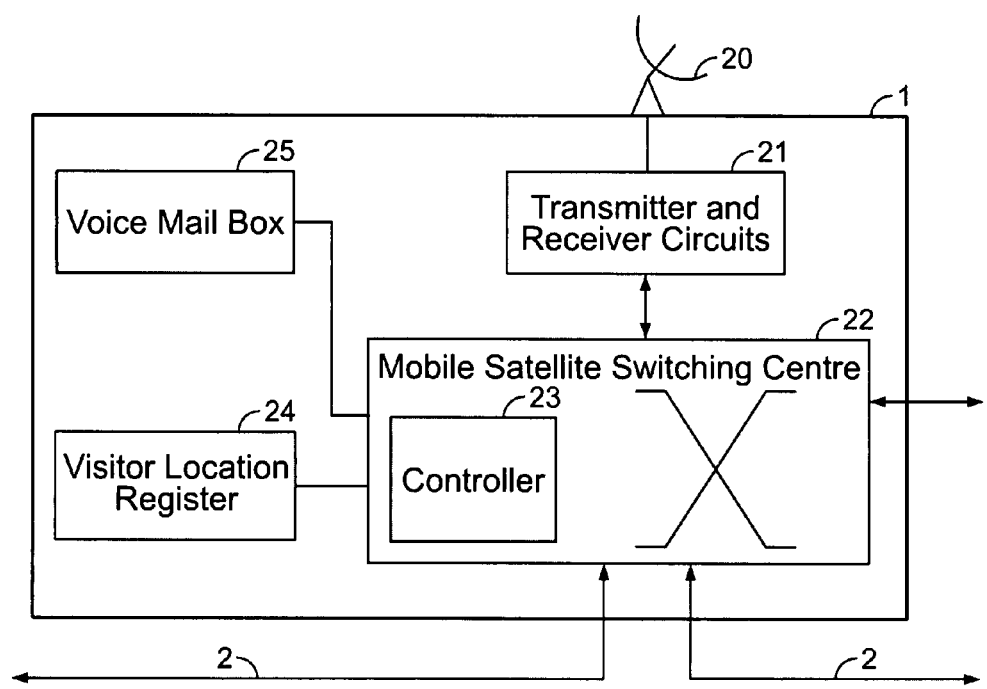
Figure 4:
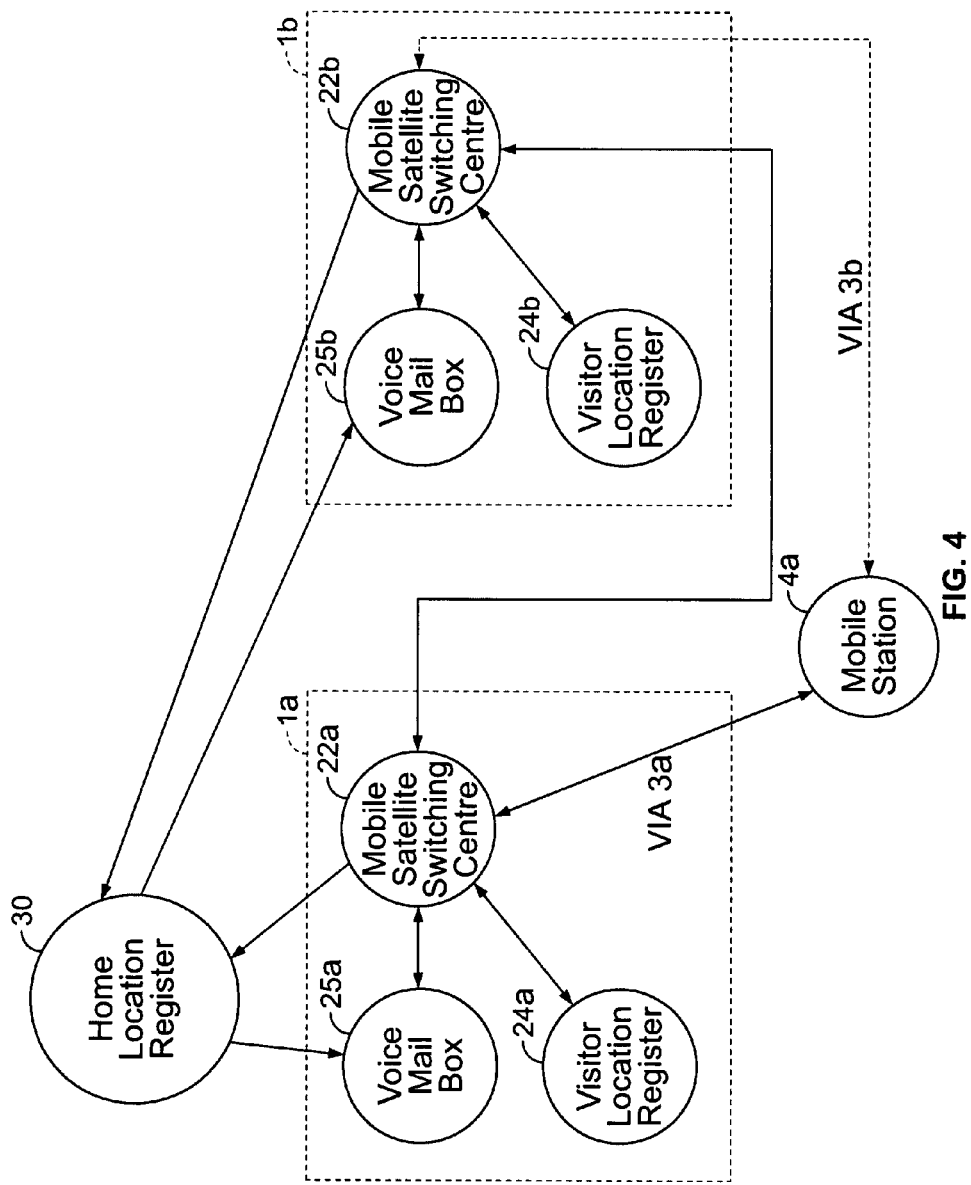
Figure 5:
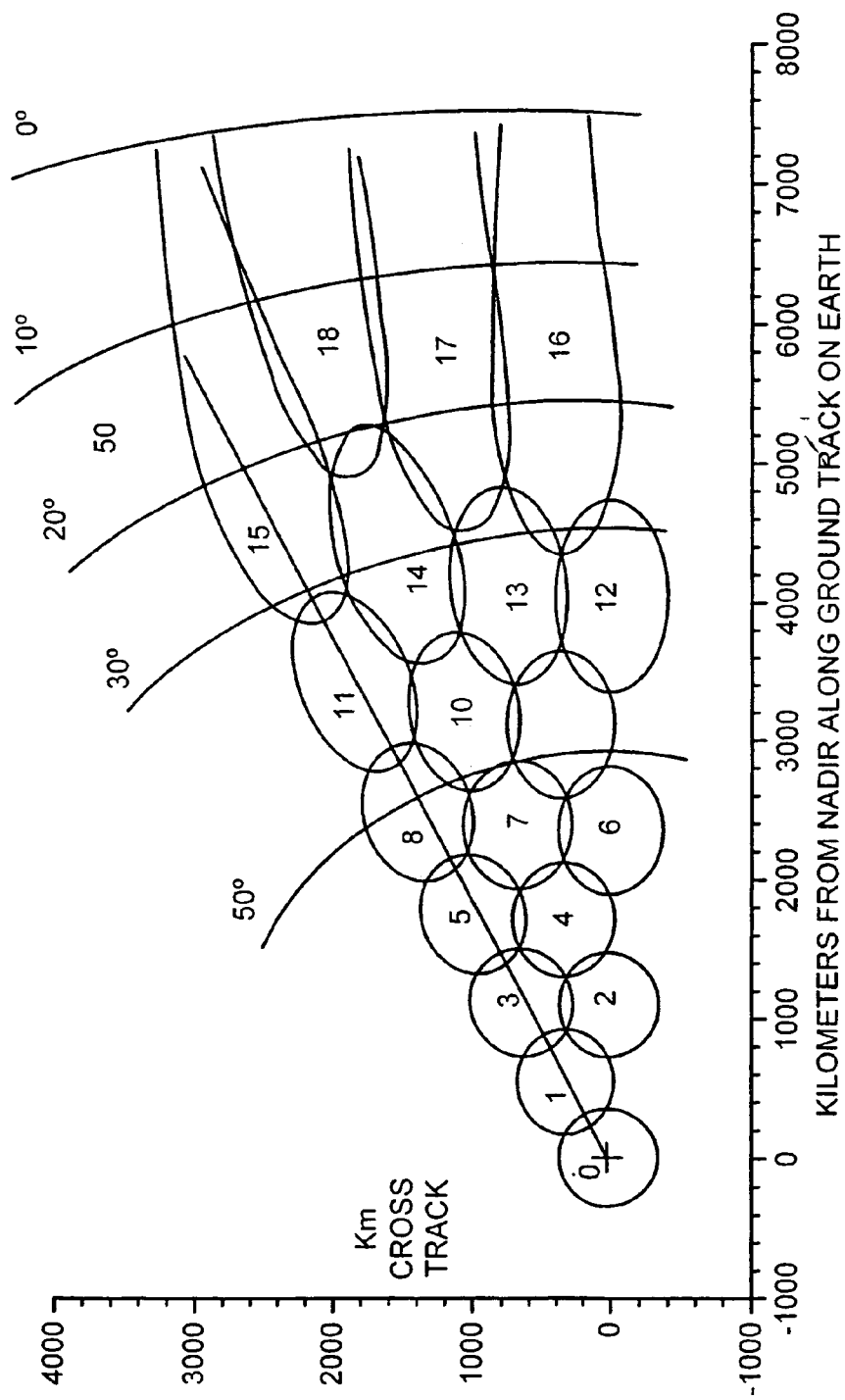
Figure 6:
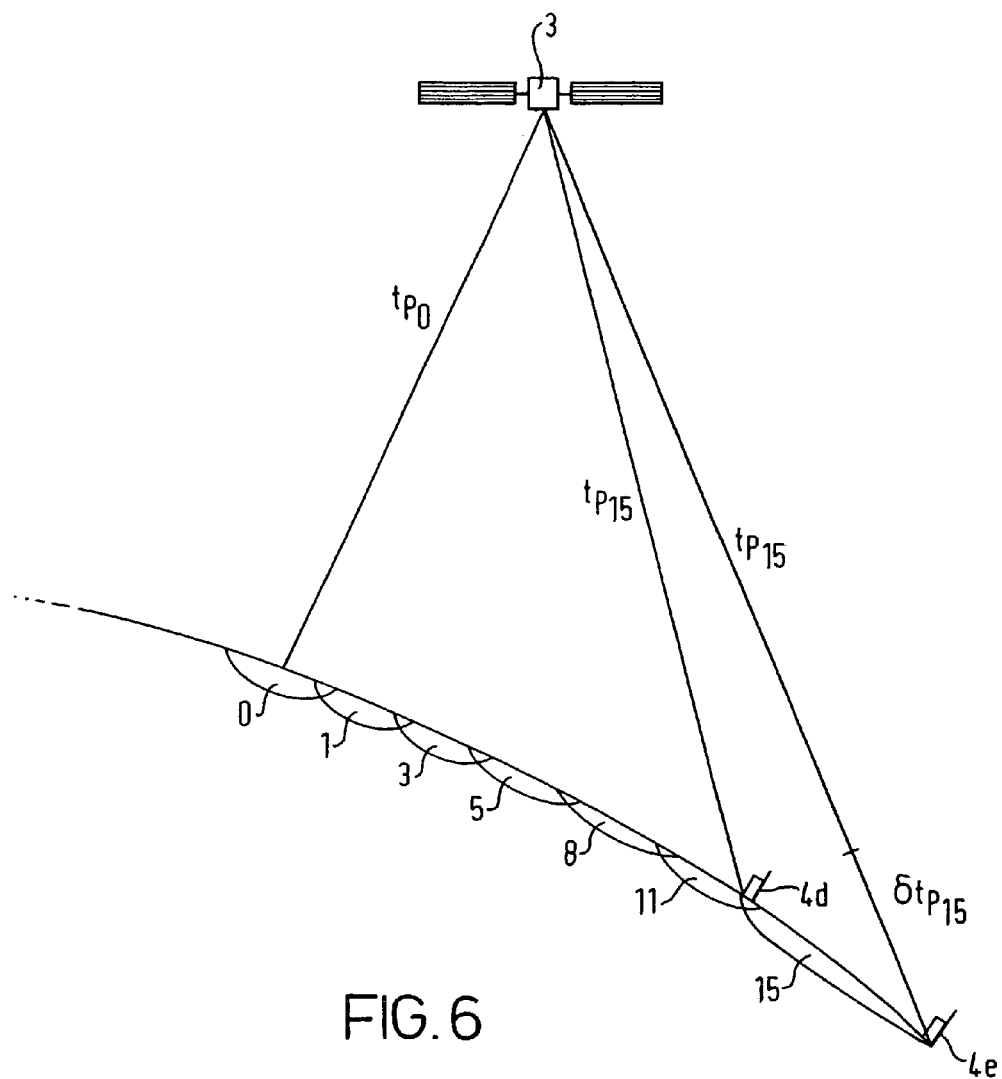

FIG. 1 illustrates a satellite mobile telephone system;
FIG. 2 shows a mobile station;
FIG. 3 is a schematic diagram of a satellite access node of the system of FIG. 1;
FIG. 4 is a data flow diagram for the system of FIG. 1;
FIG. 5 illustrates the configurations of cells on the earth's surface;
FIG. 6 illustrates the different path lengths between a satellite and mobile stations in a cell;
FIGS. 7(a) to 7(f) are timing charts illustrating the problem addressed by the present invention; and
FIGS. 8(a) to 8(f) are timing charts illustrating an embodiment of the present invention.

Referring to FIG. 1, a satellite mobile telephone system comprises a plurality of satellite access nodes $1a$, $1b$, $1c$ interconnected by a high capacity digital network 2 (hereinafter "the backbone network"), a plurality of satellites $3a$, $3b$, a plurality of a mobile stations $4a$, $4b$, gateway mobile satellite switching centres $5a$, $5b$, $5c$ providing connections between the satellite access nodes $1a$, $1b$, $1c$ and other networks 6, a network management-centre 7, a satellite control centre 8 and a tracking, telemetry and control station 9. The network management centre 7, the satellite control centre 8 and the tracking, telemetry and control station 9 are interconnected by a lower capacity digital network 10 which is also connected to the backbone network 2. The other networks 6 comprise the public switched telephone network (PSTN), cellular telephone networks and the like.

The satellite control centre 8 and the tracking, telemetry and control station 9 control the operation of the satellites $3a$, $3b$, for instance setting transmit power levels and transponder input tuning, as directed by the network management centre 7. Telemetry signals from the satellites $3a$, $3b$ are received by the tracking, telemetry and control station 9 and processed by the satellite control centre 8 to ensure that the satellites $3a$, $3b$ are functioning correctly.

The satellites $3a$, $3b$ repeatedly broadcast control information in broadcast control channels (BCCH). A mobile station $4a$ repeatedly receives and decodes the information in the BCCH broadcast by the satellite $3a$, $3b$ currently serving it.

During a telephone call, a mobile station $4a$, $4b$ communicates with a satellite $3a$, $3b$ via a half duplex channel comprising a downlink channel and an uplink channel. The channels comprise TDMA time slots on frequencies allocated on initiation of the call or re-allocated during a call.

The satellites $3a$, $3b$ are in non-geostationary orbits and comprise generally conventional satellites, such as the known Hughes HS601 model, and may include features as disclosed in GB-A-2288913. Each satellite $3a$, $3b$ is arranged to generate an array of beams covering a footprint beneath the satellite, each beam including a number of different frequency channels and time slots.

Referring to FIG. 2, a mobile station 4 is generally similar to the units presently available for GSM networks and comprises a codec, a controller 16, a microphone 10, a loudspeaker 11, a battery 12, a keypad 13, a radio frequency interface, an antenna 14, a display 15 and subscriber identification module (SIM) smart card.

The codec comprises a low bit-rate coder, which generates a speech bit stream at 3.6 kbits/s, together with a channel coder, which applies error correction codes to the speech bit stream to produce an encoded bit stream at 4.8 kbits/s. The low bit-rate coder is a linear predictive coder. The channel coder uses Viterbi coding. The codec also comprises complementary decoders.

The SIM includes a processor and a non-volatile memory which stores data identifying the subscriber and data for use in encrypted communication.

Referring to FIG. 3, a satellite access node 1 comprises a dish antenna 20 mounted for tracking satellites, transmitter and receiver circuits 21 including amplifiers, multiplexers, demultiplexers and codecs, a visited mobile satellite switching centre 22 including a controller 23, a visitor location register 24 and a voice mail box unit 25. The mobile satellite switching centre 22 is coupled for communications signals to the backbone network 2, to a gateway and to the transmitter and receiver circuits 21. The controller 23 is coupled for data signals to the visitor location register 24 and the voice mail box unit 25 and may also send and receive data signals via the backbone network 2.

The controller 23 responds to addresses on incoming communications signals, from the antenna 20, the gateway and the backbone network 2, by controlling the mobile satellite switching centre 22 to output the communications signals on the appropriate paths to their destinations, i.e. the antenna 20, the gateway or the backbone network 2.

The visitor location register 24 maintains a record of each of the subscribers registered with the satellite access node 1. The voice mail box unit 25 provides storage space for voice mail messages for subscribers.

Referring to FIG. 4, a database 30, called the home location register, contains records relating to each mobile station 4a, 4b. The record contains the mobile station's identity (International Mobile Subscriber Identity or IMS), the current status of the mobile station (whether it is "local" or "global" as will be described in greater detail below), the geographical position of the mobile station, the home mobile satellite switching centre with which the mobile station is registered (to enable billing and other data to be collected at a single point), the currently active satellite access node with which the mobile station is in communication via a satellite, an individual encyphering key and the address of an associated voice mail box unit location.

The home location register 30 may be located in the network management centre 7 (see FIG. 1) or may be distributed among the satellite access nodes 1a, 1b, 1c (see FIG. 1).

Referring to FIGS. 1 to 4, a mobile station 4a may be registered with one of two distinct statuses; "local" in which the mobile station 4a is permitted to communicate only through one local area or part of the satellite system network, and "global", which entitles the mobile station 4a to communicate through any part of the satellite mobile telephone system.

The mobile station 4a performs an automatic registration process (location update), of the kind well known in the art of cellular terrestrial communications, on each occasion when the mobile station 4a is switched on, periodically whilst the mobile station 4a is operating and, as will be explained in detail below, when the mobile station 4a has been unpageable for a predetermined period. As is conventional, the registration process takes the form of transmitting of a signal identifying the mobile station 4a (e.g. by transmitting its telephone number on a common hailing or signalling channel).

The transmitted signal is picked up by one or more of the satellites 3a, 3b. Under normal circumstances, the signal is picked up by a plurality of satellites 3a, 3b, and the received signal strength or time of arrival are transmitted, together with the identity of the mobile station 4a and the identity of the satellite 3a, 3b receiving the signal, to the home location register 30 via the visited mobile satellite switching centres 22a, 22b of the satellite access nodes 1a, 1b for which the satellites 3a, 3b are in communication.

The home location register 30 calculates, on the basis of the received-signal arrival times, the terrestrial position of the mobile station 4a which is then stored in the mobile station's record. When it is necessary to communicate with the mobile station, the identity of the satellite access node 1a, 1b, 1c most suitable for communicating with the mobile station 4a is determined. This is typically done by comparing the stored position of the mobile station 4a with the positions of each of the satellite access nodes 1a, 1b, 1c and selecting the nearest. However, account may also or instead be taken of the strengths of the signals received via the satellites 3a, 3b, or of other factors such as network congestion which may result, in borderline cases, in the selection of a satellite access node 1a, 1b, 1c which is not geographically closest to the mobile station 4a. The identity of the allocated satellite access node 1a is then stored in the mobile station's record in the visitor location register 25a of the visited mobile satellite switching centre 22a where the mobile station 4a is registered. The information stored in the visitor location register 25a is used for routing mobile terminated calls to the mobile station 4a.

When a mobile terminated call is made to the mobile station 4a, it is directed to the visited mobile satellite switching centre 22a at which the mobile station 4a is registered. The visited mobile satellite switching centre 22a causes a paging signal to be sent to the cells where the called mobile station 4a is expected to be, i.e. via the satellites 3a, 3b serving cells covering the mobile station's location. When the mobile station 4a receives the paging signal, it enters into a dialogue with the network to obtain a channel for the call. If the mobile station 4a does not respond to the paging signal, the network will inform the calling party that the mobile station 4a cannot be reached.

When a mobile originating call is to be made, the user of the mobile station 4a enters the number to be dialled and presses a "send" key. The mobile station 4a responds by sending an access request using a random access channel on a dedicated frequency to the network via one or more visible satellites 3a, 3b. The network selects a satellite access node 1a to respond on the basis of the quality of the access request signals received. The selected satellite access node 1a sends a immediate assignment message using a access grant channel. The immediate assignment message includes the physical parameters of a slow dedicated control channel assigned by the network. The radio link setup is completed using the slow dedicated control channel and then the connection of the call is attempted. On connection of the call, the mobile station 4a is allocated a traffic channel that is then used for the call.

Referring to FIG. 5, each cell is defined by one beam spot and falls into one of nineteen categories, types 0 to 18. The cell at a satellite's nadir is relatively small and circular. However, the cells become larger and radially elongated as one moves towards the periphery of the satellite's coverage.

FIG. 6 shows the relative positions of the cells along the line 50 in FIG. 5 and the satellite 3 serving them. It can be seen that the propagation time for signals from the satellite 3 to the type 0 cell is $t_{p_0}$ (34.5 ms for a satellite at 10 355 km altitude). The propagation time from the satellite 3 to a mobile station 4d at the inner limit of a type 15 cell is $t_{p_{15}}$ (40.3 ms) and the propagation time to a mobile station 4e at the outer limit of a type 8 cell is $t_{p_{15}} + \delta t_{p_{15}}$ (50.5 ms).

The problem addressed by the present invention will now be described in more detail with reference to the operation of a satellite mobile telephone system not having the benefit of the present invention.

Figure 7:
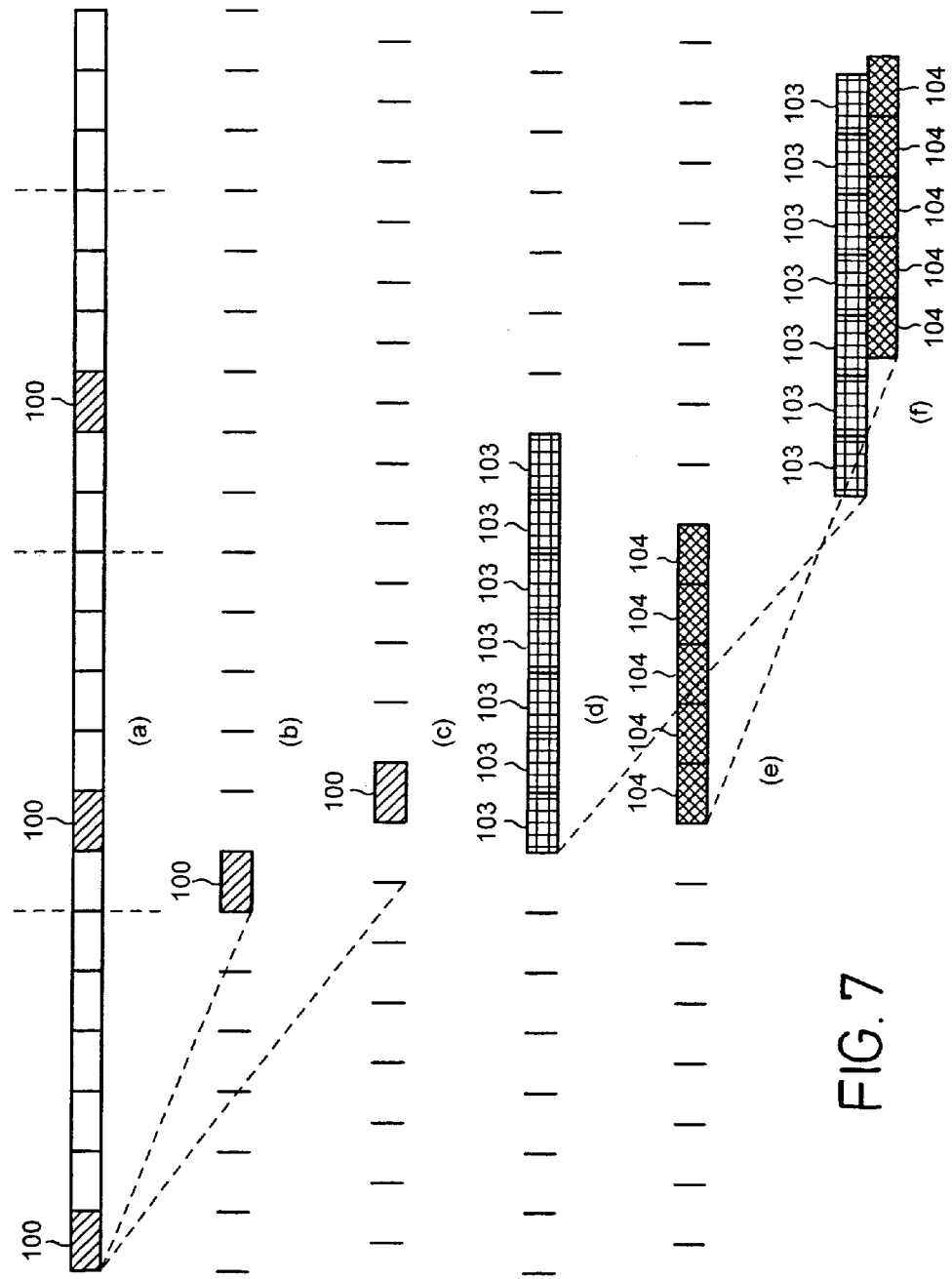

Referring to FIG. 7(a), which shows the TDMA timebase at the satellite 3, each time slot in the TDMA scheme used is 6.667 ms long and each frame comprises six time slots. One time slot in each frame is used for the broadcast control channel bursts 100.

Referring to FIG. 7(b), the mobile station 4d at the inner limit of a type 15 cell will receive a broadcast control channel burst 100 40.3 ms after its transmission by the satellite 3. Referring to FIG. 7(c), the mobile station 4e at the outer limit of a type 15 cell will receive a broadcast control channel burst 100 50.5 ms after its transmission by the satellite 3.

Referring to FIGS. 7(d) and 7(e), the mobile stations 4d, 4e construct local timebases on the basis of the arrival times of the broadcast control channel bursts 100. The mobile stations 4d, 4e may then transmit random access channel bursts 103, 104 in any of the time slots defined by the local timebase on the dedicated random access channel frequency. Referring to FIG. 7(f), it can be seen that it is possible for random access channel bursts 103, 104 to overlap at the satellite 3. When this occurs, the signals interfere and the random access channel transmissions are unsuccessful.

Figure 8:
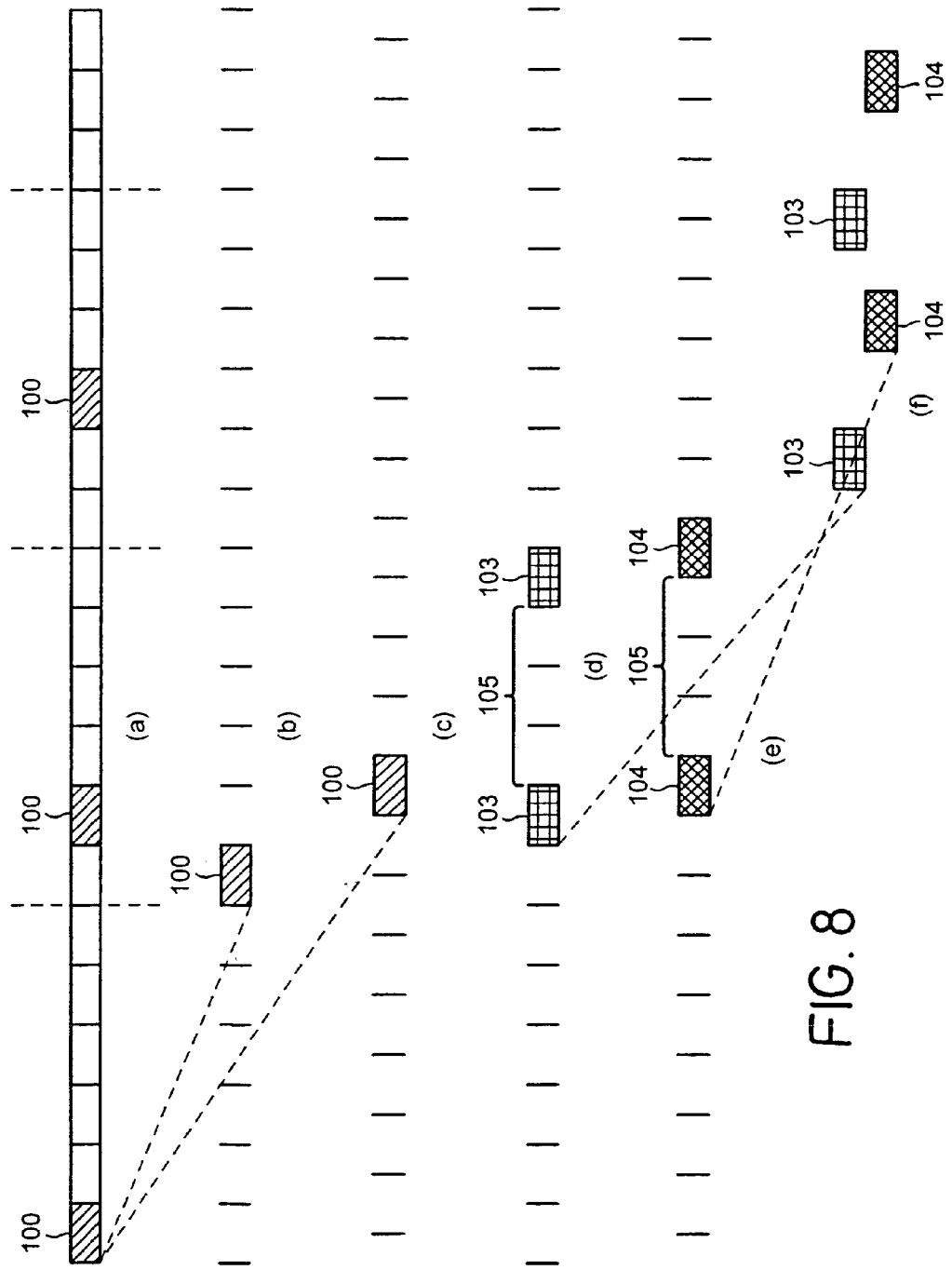

An embodiment of the present invention will now be explained with reference to FIG. 8.

FIGS. 8(a) to 8(c) illustrate the same events as FIGS. 7(a) to 7(c). Referring to FIGS. 8(d) and 8(e), the mobile stations 4d, 4e are no longer permitted to transmit random access channel bursts 103, 104 in any time slots. Instead, the time slots, that may contain a random access channel burst 103, 104 are separated by three time slots 105 that may not be occupied by random access channel bursts 103, 104. The mobile stations 4d, 4e set the time slots for random access bursts 103, 104 so that they have the same relationship with received broadcast control channel bursts 100. For instance, random access channel bursts 103, 104 may be transmitted in the time slot following a time slot containing a particular broadcast control channel burst 100 and every fourth time slot thereafter.

Referring to FIG. 8(f), it can be seen that there is now no possibility of random access channel bursts 103, 104, from the mobile stations 4d, 4e at respectively the inner and outer limits of the type 15 cell, colliding at the satellite 3.

Referring again to FIG. 2, a mobile station 4 adapted for operation according to the present invention may have its controller 16 programmed to leave gaps, suitable to deal with the worst case situation (i.e. largest path length differential found among all of the cells served by a satellite 3), between permitted random access channel time slots. However, it is not necessary to leave gaps between permitted random access channel time slots for type 0 cells and smaller gaps can be used for intermediate cell types, e.g. type 8 cells. It is, therefore, preferred that information regarding the necessary gaps be included in the broadcast control information transmitted in the broadcast control channel. As the maximum gap required in the present embodiment is three time slots, the information is conveyed by two bits of the broadcast control information which comprise a binary representation of the number of time slots comprising the necessary gap. In this case, the mobile station's controller 16 is programmed to extract and store the two bits setting the gap and control the operation of its transmitter to only send random access channel signals in the permitted time slots defined by the stored data.

It will be appreciated that many modifications may be made to the above-described embodiment while still achieving the same aim.

The invention claimed is:

1. A method of avoiding collision between random access channel signals in a TDMA mobile telephone system in which there is a significant difference between two locations in a cell and a network antenna, the method comprising operating a mobile station so to establish a local timebase at the mobile station on the basis of a received broadcast control information signal and disabling transmission on a random access channel frequency of random access channel signals during a subset of the time slots of said local timebase, wherein random access channel signal transmission on the random access channel frequency by the mobile station is enabled in time slots separated by n time slots, during which random access channel signal transmission is disabled, where n is a positive integer selected to avoid signal collisions between multiple random access channels in the cell having the largest mobile station-network antenna path length differential.

2. A method of avoiding collision between random access channel signals in a TDMA mobile telephone system in which there is a significant difference between two locations in a cell and a network antenna, the method comprising operating a mobile station so to establish a local timebase at the mobile station on the basis of a received broadcast control information signal and disabling transmission on a random access channel frequency of random access channel signals during a subset of the time slots of said local timebase, wherein random access channel signal transmission on the random access channel frequency by the mobile station is enabled in time slots separated by n time slots, during which random access channel signal transmission is disabled, where n is a positive integer communicated to the mobile station in a broadcast control signal to mitigate interchannel collisions.

3. A method according to claim 1 or 2, wherein the network antenna is carried by a satellite.

4. A mobile station for a TDMA mobile telephone system configured for operation in a method according to claim 1 or 2.

* * * * *